US006912706B1

(12) United States Patent
Stamm et al.

(10) Patent No.: US 6,912,706 B1
(45) Date of Patent: Jun. 28, 2005

(54) INSTRUCTION PROCESSOR AND PROGRAMMABLE LOGIC DEVICE COOPERATIVE COMPUTING ARRANGEMENT AND METHOD

(75) Inventors: Reto Stamm, Los Gatos, CA (US); Ciaran McGloin, Dublin (IE); David McNicholl, Dundalk (IE)

(73) Assignee: Xilinx, Inc., San Jose, CA (US)

( * ) Notice: Subject to any disclaimer, the term of this patent is extended or adjusted under 35 U.S.C. 154(b) by 707 days.

(21) Appl. No.: 09/930,607

(22) Filed: Aug. 15, 2001

(51) Int. Cl.$^7$ .............................................. G06F 17/50
(52) U.S. Cl. ................................. 716/17; 716/16
(58) Field of Search ..................... 716/1–18; 717/173, 717/9

(56) References Cited

U.S. PATENT DOCUMENTS

| 5,109,353 | A | | 4/1992 | Sample et al. |
| 5,499,192 | A | | 3/1996 | Knapp et al. |
| 5,684,980 | A | | 11/1997 | Casselman |
| 5,802,290 | A | | 9/1998 | Casselman |
| 5,946,219 | A | | 8/1999 | Mason et al. |
| 6,023,755 | A | | 2/2000 | Casselman |
| 6,077,315 | A | * | 6/2000 | Greenbaum et al. ........ 717/157 |
| 6,078,736 | A | | 6/2000 | Guccione |
| 6,216,259 | B1 | * | 4/2001 | Guccione et al. ............. 716/17 |
| 6,289,440 | B1 | | 9/2001 | Casselman |
| 6,430,736 | B1 | * | 8/2002 | Levi et al. .................... 716/17 |
| 6,438,738 | B1 | * | 8/2002 | Elayda ........................ 716/16 |
| 6,496,971 | B1 | * | 12/2002 | Lesea et al. .................. 716/16 |

FOREIGN PATENT DOCUMENTS

| EP | 645 723 A2 | 3/1995 |
| WO | WO 94/10627 | 5/1994 |

OTHER PUBLICATIONS

Xilinx, Inc.; "The Programmable Logic Data Book"; Sep. 1996; available from Xilinx, Inc., 2100 Logic Drive, San Jose, California 95124; pp. 4–251 to 4–286.

Eric Lechner and Steven A. Guccione; "The Java Environment for Reconfigurable Computing"; Proceedings—Field Programmable Logic and Applications, 7th International Workshop, FPL 1997; London, UK; Sep. 1–3, 1997, pp. 284–293.

Iseli et al.; "A C + + Compiler for FPGA Custom Execution Units Synthesis"; Apr. 19–21, 1995; IEEE Symposium on FPGAs for Custom Computing Machines; pp. 173–179.

Peterson et al.; "Scheduling and Partitioning ANSI–C Programs Onto Multi–FPGA CCM Architectures"; IEEE Symposium on FPGAs for Custom Computing Machines; Apr. 17–19, 1996; pp. 178–187.

Guccione et al.; "A Data–Parallel Programming Model for Reconfigurable Architectures"; Apr. 5–7, 1993; IEEE Workshop on FPGAs for Custom Computing Machines; pp. 79–87.

* cited by examiner

*Primary Examiner*—Matthew Smith
*Assistant Examiner*—Binh Tat
(74) *Attorney, Agent, or Firm*—LeRoy D. Maunu; Lois D. Cartier

(57) ABSTRACT

A method and arrangement for executing instructions of a computer program using a programmable logic device to perform selected functions of the program. Profile data for code segments of the computer program are generated during program execution. Based on the profile data, a code segment is selected for transformation to a hardware implementation. The functionality of the selected code segment is transformed into a configuration bitstream, and the PLD is configured with the configuration bitstream. During program execution, the PLD is activated in lieu of executing the code segment.

13 Claims, 5 Drawing Sheets

INSTRUCTION PROCESSOR AND PROGRAMMABLE LOGIC DEVICE COOPERATIVE COMPUTING ARRANGEMENT AND METHOD

FIELD OF THE INVENTION

The present invention generally relates to computing arrangements, and more particularly to a computing arrangement including programmable logic circuitry and an instruction processor that transforms a sequence of instructions into a configuration bitstream for the programmable logic circuitry such that the programmable logic circuitry performs the function of the sequence of instructions in lieu of execution by the instruction processor.

BACKGROUND

In designing an electronic system, it is generally accepted that some functions are better implemented in hardware and others in software. Whether a function is implemented in hardware or software is a decision that is made during system design. The decision is made based on a variety of factors, for example, feasibility, flexibility, cost, performance, and time constraints.

Once a system is defined at the design stage and then implemented, the segregation of functions between hardware and software is generally fixed. To change which functions are implemented on hardware and which functions are implemented on software requires a new design and a new implementation. Thus, the design is generally static and addressing changed conditions or requirements would require a costly redesign.

Reconfigurable computing arrangements based on programmable logic devices (PLDs) have been developed to address problems associated with static designs and also to improve performance. A reconfigurable computing arrangement generally includes a processor arrangement and one or more PLDS. The processor arrangement executes software that implements a desired application and also executes software that configures the PLD to implement a hardware portion of the application. Reconfigurable computing arrangements based on PLDs can be configured to adapt the functions implemented on the PLD in response to changing, application-dependent conditions. While reconfigurable computing arrangements provides a level of adaptability to changing application requirements, systems based on a reconfigurable computing arrangement still require designing the application with the architecture of the computing arrangement as a target implementation. To implement an existing software application in a reconfigurable computing arrangement would also require redesign of the application.

A number of strategies are employed to improve the performance of existing software applications. One strategy is to run the software on a faster processor. However, each new software release often includes a substantial amount of new code that may to some degree negate the performance increase of a faster processor. Another strategy is to redesign the software system and implement selected functions in hardware. While this may be accomplished in a reconfigurable computing arrangement, extensive redesign of the software application would be required.

A system and method that address the aforementioned problems, as well as other related problems, are therefore desirable.

SUMMARY OF THE INVENTION

In various embodiments, a method and arrangement are provided for executing instructions of a computer program using a programmable logic device to perform selected functions of the program. Profile data for code segments of the computer program are generated during program execution. Based on the profile data, a code segment is selected for transformation to a hardware implementation. The functionality of the selected code segment is transformed into a configuration bitstream, and the PLD is configured with the configuration bitstream. During program execution, the PLD is activated in lieu of executing the code segment.

Various example embodiments are set forth in the Detailed Description and claims which follow.

BRIEF DESCRIPTION OF THE DRAWINGS

Various aspects and advantages of the invention will become apparent upon review of the following detailed description and upon reference to the drawings in which.

DETAILED DESCRIPTION

In various embodiments, the present invention is a computing arrangement that includes an instruction processing engine that is coupled to a programmable logic device (PLD). The instruction processing engine includes a software layer that profiles the software, selects one or more segments of code for implementation on the PLD, and transforms the selected segments of code to a configuration bitstream for the PLD. The configuration bitstream is then loaded into the programmable logic device. When a transformed code segment is referenced during execution of the software, the PLD is activated to perform the function of the code segment. Performance of the application is improved by virtue of optimized hardware executing in parallel on the PLD versus using a limited set of hardware instructions running sequentially on the processing engine. Furthermore, the advantage of improved performance is accomplished without a costly redesign of the application.

Figure 1:
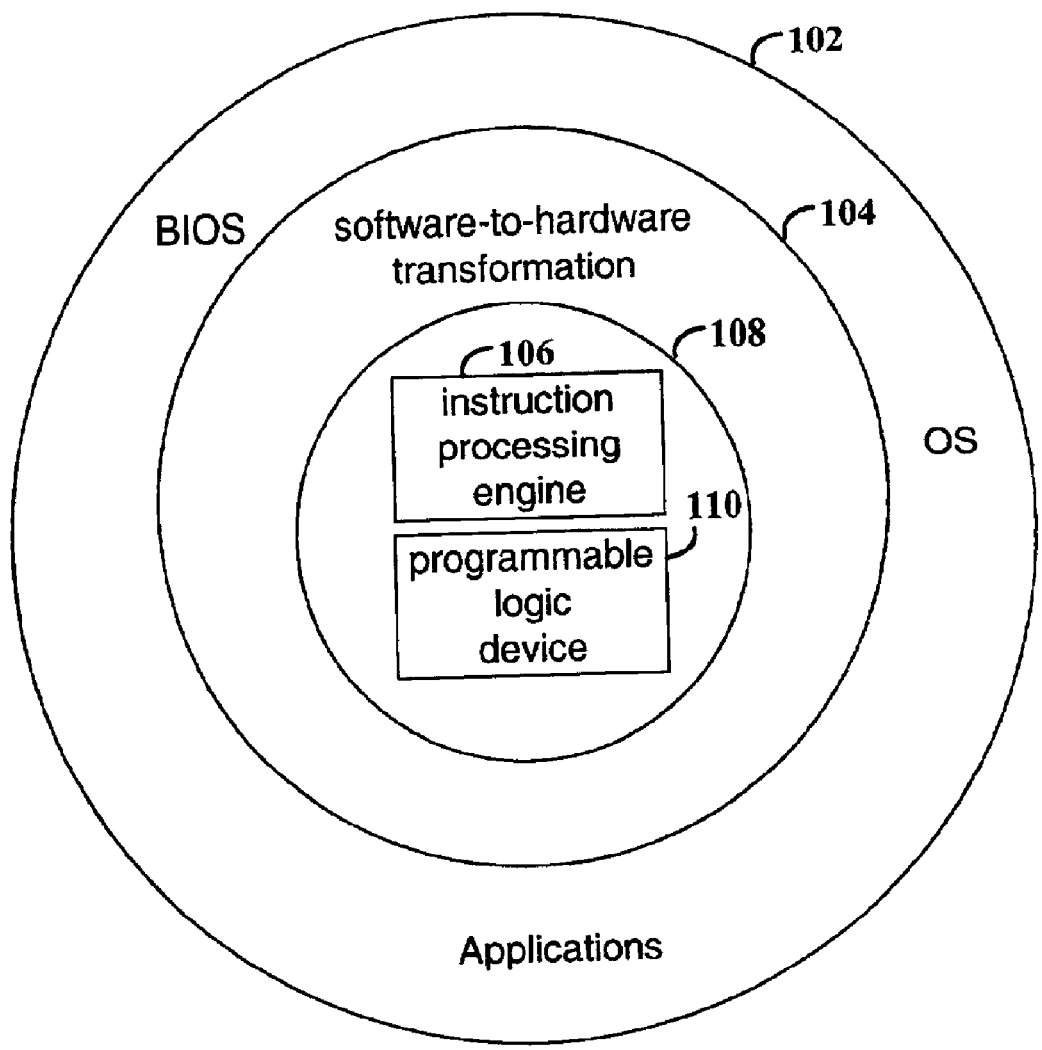
FIG. 1 illustrates the layered relationship between the components of a computing arrangement in accordance with one embodiment of the invention.

FIG. 1 illustrates the layered relationship between the components of the computing arrangement in accordance with one embodiment of the invention. At the outer layer are the operating system (OS), basic I/O system (BIOS), and application software. The software in outer layer 102 is comprised of instructions from an instruction set for a selected processor architecture, for example the x86 processor architecture from Intel.

Layer 104 includes software that profiles the software in layer 102, selects segments of code for implementing in hardware, and transforms the code segments to a configuration bitstream. In an alternative embodiment, layer 104 first transforms instructions from a first instruction set to a second instruction set. For example, the code Morphine™ software from Transmeta transforms x86 instructions to instructions that are executable by the hardware engine of the Crusoe processor.

In one embodiment, programmable logic device 110 is a field programmable gate array (FPGA), such as a Virtex™ FPGA from Xilinx. FPGAs that support parallel programming modes and partial reconfigurability are especially suitable for the present invention.

Figure 2:
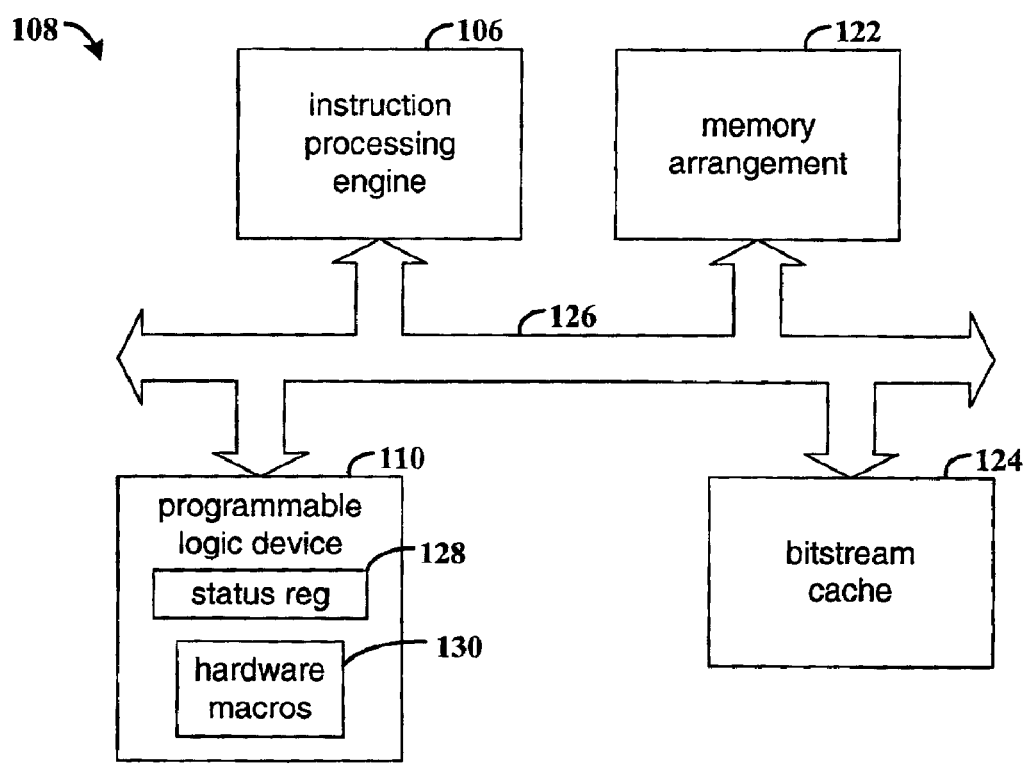
FIG. 2 is a functional block diagram of the hardware layer of the computing arrangement.

FIG. 2 is a functional block diagram of hardware layer 108. In addition to instruction processing engine 106 and programmable logic device 110, hardware layer 108 also includes memory arrangement 122 and bitstream cache 124. Memory arrangement 122 includes storage for instructions and data referenced by the instruction processing engine, and storage for data manipulated by the programmable logic device. Thus, the particular characteristics of memory arrangement 122 depend on the applications to which the computing arrangement is directed. Bitstream cache 124 provides storage for the configuration bitstream that is used to configure PLD 110 and is implemented as RAM or disk storage depending on implementation requirements.

The instruction processing engine 106, PLD 110, memory arrangement 122, and bitstream cache 124 are coupled by interconnect circuitry 126. In an example embodiment, interconnect circuitry 126 is implemented with a conventional data/address bus. Instruction processing engine 106 retrieves instructions from and manipulates data in memory arrangement 122 via interconnect circuitry 126. In addition, the instruction processing engine 106 generates and stores the configuration bitstream in bitstream cache 124 via the interconnect circuitry. Depending on application requirements, the bitstream cache is implemented either as a separate RAM or as part of memory arrangement 122.

Interconnect circuitry 126 is also used for configuration of PLD 110. Under control of instruction processing engine 106, the configuration bitstream from bitstream cache 124 is transferred to the PLD 110. Thus, interconnect circuitry includes signals lines to control configuration of the PLD by the instruction processing engine, and in another embodiment also to control readback of configuration data from the device. For example, the configuration/readback of the programmable logic device includes control signals for selecting a chip, initiating configuration, signaling when configuration is complete, and selecting a configuration mode (serial or parallel). There may be other configuration/readback control signals depending on the programmable logic device chosen for a particular implementation.

When PLD 110 is activated by instruction processing engine 106 during execution of a program, data needed to perform the function implemented in the PLD are transferred from memory arrangement 122 to the PLD. When the PLD has completed the implemented function or during operation, data are transferred back to the memory arrangement. Thus, interconnect circuitry 126 provides addressing and read and write capabilities for PLD 110 to memory arrangement 122.

In one embodiment, instruction processing engine 106 drives a run signal to activate the PLD to perform an implemented function. PLD 110 includes status register 128 that has a bit to capture the run signal. After the programmable logic device has performed the function, a done signal driven by a bit in the status register drives an interrupt port (not shown) on the instruction processing engine.

Status register 128 includes multiple run bits to support implementations of multiple functions provided by multiple code sequences of a program. Each run bit is associated with a function. For example, each transformed code sequence is referenced as a hardware macro 130, and multiple hardware macros are implemented on PLD 110. Alternatively, one interrupt port is shared between multiple hardware macros. The interrupt driver logic and status register are on the PLD such that after the operating system jumps to the interrupt service routine, the status register on the PLD is read and a jump is made to the correct hardware macro driver. Having one shared interrupt port adds a little overhead in polling but it is easier to implement in hardware than implementing multiple interrupt ports.

In another embodiment, PLD circuitry is integrated with the instruction processing engine on a single chip. Higher levels of integration provide lower communication overhead, thereby improving efficiency. It will be appreciated, however, that the size of the PLD circuitry integrated with the instruction processing engine circuitry will depend on the available circuit space and thereby limit the amount of code it is possible to convert.

In an alternative embodiment, the instruction processing engine and the software layers 102 and 104 are implemented on PLD 110. The portions of the PLD that are not used to implement the instruction processing engine are available to implement the selected code segments. The PLD itself controls the reconfiguration. The Virtex FPGA from Xilinx is suitable for such partial reconfiguration.

Figure 3:
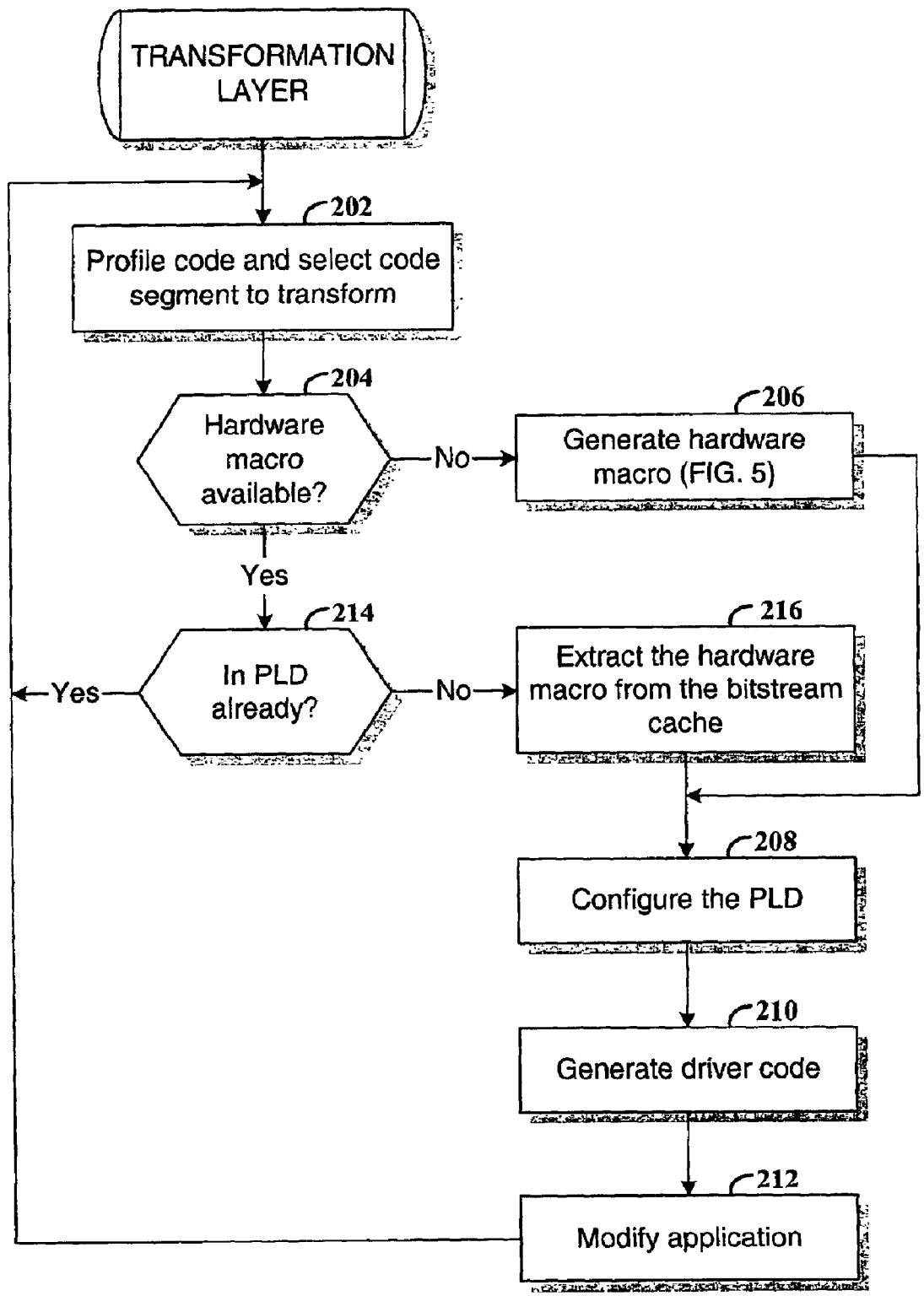
FIG. 3 is a flowchart of a process performed by the software layer that transforms selected software to a configuration bitstream.

FIG. 3 is a flowchart of a process implemented in the software-to-hardware transformation layer 104 in transforming a segment of code into a configuration bitstream in accordance with an example embodiment of the invention. At step 202, the transformation layer 104 profiles the software and selects one or more code segments to transform.

The profiling of the software is performed using conventional techniques. In one embodiment the profiling data include execution frequencies of loops of code, execution times of code segments, branch histories, and dependencies of loops in the application. The dependency information is used because merely selecting the most frequently executed loop may result in selecting a loop that is not sufficiently complex to cost-justify transformation. Thus, the dependency information is used to traverse a dependency graph and select larger segments of code to transform.

Candidate code segments are evaluated based on the amount of time the application spends in execution of the code segments and on the likely "complexity" of the resulting hardware macro. For example, in one embodiment complexity is forecast based on the size of the resulting hardware macro.

In selecting a code segment to transform to a hardware macro, selecting a segment based simply on the segment having a greater relative execution time may not be optimal. Since the execution times of hardware macros may not have the same relative magnitudes as the execution times of the corresponding code segments, it may be more beneficial from an overall performance perspective to select a code segment that does not have the greatest execution time. For example, there are two code segments that are candidates for transformation. The first code segment has a software execution time of $T_{1SW}$, and the second code segment has a software execution time of $T_{2SW}$, where $T_{1SW} > T_{2SW}$. The corresponding hardware macro execution times are $T_{1HW}$ and $T_{2HW}$. If $T_{1SW} + T_{2SW} > T_{1SW} + T_{2SW}$, then from an application performance perspective the second code segment should be selected for transformation since the total execution time is less than if the first code segment was selected for transformation.

In considering the relative execution times of code segments implemented as hardware macros, the code segments under consideration are at least partially implemented as hardware macros. The further along in the process of converting to hardware the easier it is to estimate the execution time of the macro. When the macro has been synthesized an exact measurement is possible. It will be appreciated that there is a tradeoff between the time needed for two conversions and the improved speedup through selecting the most suitable macro.

Certain pieces of code will have more Instruction Level Parallelism (ILP) than others and will be more suitable for conversion. Thus, the estimated performance gain can be determined from the ILP extracted from each code segment. The optimization process converts from a sequential representation of the algorithm to a parallel hardware representation by extracting the parts that do not have serial dependencies and configuring the parts to execute in parallel. It is then estimated how much faster the macro will run.

Figure 5:
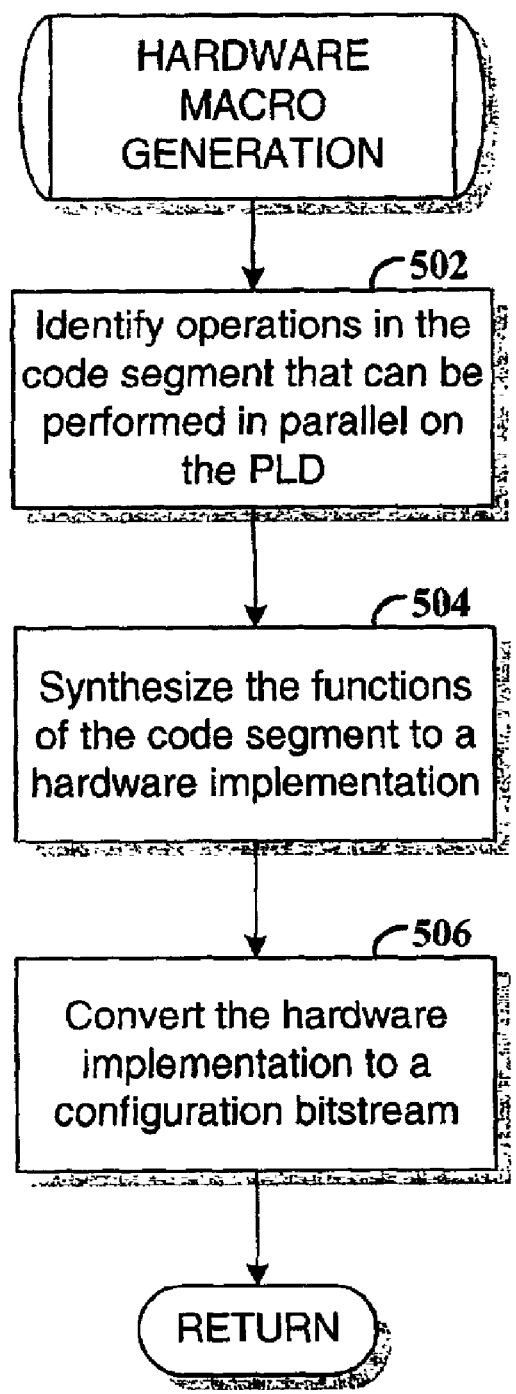
FIG. 5 is a flowchart of a process for transforming a code sequence into a hardware macro for a programmable logic device.

Once a code segment is selected for transformation, decision step 204 tests whether a hardware macro has already been generated. The process is directed to step 206 to transform the code segment to a hardware macro if no hardware macro currently exists for the code segment. Further details on the transformation are shown in FIG. 5. After the code has been transformed, the process continues at step 208 where the PLD is configured with the hardware macro. If the system is at the limit of hardware macros that can be implemented on the PLD, then the transformation layer selects a hardware macro within the PLD for replacement by the selected hardware macro. The replaced hardware macro is stored in the bitstream cache.

At step 210, driver code is generated to interface with the hardware macro. The driver code is responsible for transferring data to the hardware macro when the hardware macro is initiated. For example, the contents of processor registers are needed as well as the location of data in the RAM. In addition, the driver code stores the processor state prior to initiating the hardware macro and restores the processor state when the macro completes. When execution of the hardware macro is complete, the driver code restores the processor state and stores results provided by the PLD, if necessary, in the memory arrangement at the locations expected by the software.

After generating the driver code, step 212 modifies the application code. A jump instruction is written as the first instruction of the transformed code segment, and the jump instruction has a target address that points to the driver code. It will be appreciated that before overwriting the first instruction of the transformed segment, the first instruction is saved. If the hardware macro is removed from the PLD, the instruction can then be restored. The process then continues at step 202 where profiling and transformation of the code continues.

The profiling and code selection process continues as long as the application is executing. Thus, as the application executes, the code segments that are implemented as hardware macros may change or evolve as processing needs change. Thus, decision step 204 may find that a hardware macro already exists for the selected code segment. If so, decision step 214 tests whether the hardware macro is already present in the PLD. The process continues at step 202 if the hardware macro is already present. Otherwise, the process is directed to step 216 to extract from the bitstream cache 124 the corresponding hardware macro.

Since the PLD 110 has limited resources for hardware macros and the code segments that are implemented as hardware macros may change during the course of executing an application, the bitstream cache is available for storage of hardware macros. The bitstream cache is used for swapping hardware macros in and out of the PLD during execution of the application. When a code segment is selected, a hardware macro for the selected segment is already implemented in bitstream cache 124, and the PLD has no space for additional hardware macros, the transformation layer 104 selects a hardware macro in the PLD for replacement. The code segment associated with the selected macro is reactivated, and the selected macro in the PLD is then replaced with the hardware macro from the bitstream cache 124. The process then continues at step 208 where the PLD is configured with the hardware macro.

Figure 4:
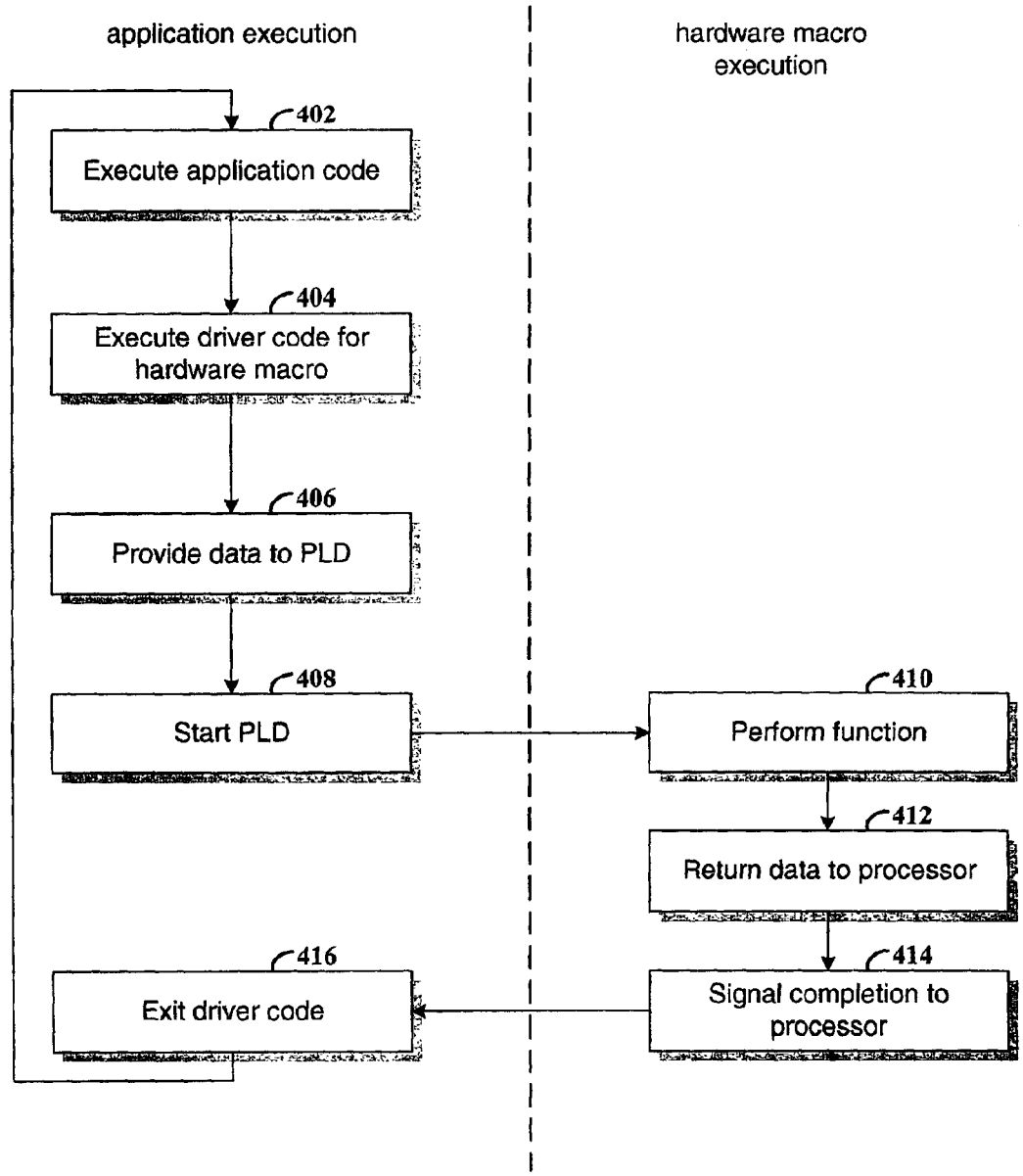
FIG. 4 is a flowchart that illustrates the processing performed in execution of application software in combination with a hardware macro implemented on a programmable logic device.

FIG. 4 is a flowchart that illustrates an example process performed in execution of the application in conjunction with execution of a hardware macro. The application executes at step 402 under the control of the transformation layer 104. When a transformed code segment is encountered, the code jumps to the driver code, which is executed at step 404. At step 406, the driver code provides any necessary data to the PLD, and at step 408, the PLD is activated to begin execution of the hardware macro.

After the FPGA has been loaded and is running, in one embodiment the transformation layer 104 is configured to perform a context switch and continue with another task in response to a request from the operating system. The context switch is controlled by disabling the hardware macro so that the hardware macro does not attempt to access the memory arrangement while another task is executing. It will be appreciated that a performance gain may be achieved if the hardware macro continues execution after a context switch, with memory/resource arbitration between the instruction processing engine and the PLD being controlled as necessary. The transformation layer 104 reactivates the hardware macro when the operating system switches the context back.

At step 410, the PLD is executing and performs the implemented function. During execution, as shown by step 412 data are stored in the memory arrangement 122 or returned to the instruction processing engine 106, depending on the implemented function. When the hardware macro completes execution, the PLD signals (step 414) the processor that execution is complete.

At step 416, the driver code exits and returns control to the application.

FIG. 5 is a flowchart of a process for generating a hardware macro in accordance with an example embodiment of the invention. At step 502, the selected code segment is analyzed for optimization. The analysis process identifies instructions that can be performed in parallel. These instructions are implemented as parallel operations in the hardware macro. Example operations to increase execution speed include: loop unrolling, pipelining, amalgamation of operations into higher bit width hardware (e.g., large bit-width multiplications are performed as a series of operations whereas we can put down a multiplier with the required width).

At step 504, the optimized representation of the code segment is synthesized to a hardware implementation. This involves converting the optimized representation to a hardware implementation specific to the type of PLD used. The hardware implementation is then converted into a configuration bitstream at step 506. The synthesis process adds control circuitry to handle accessing the-required locations in the memory arrangement and tracking the values stored in the registers. The hardware implementation also obtains values from registers that are used when the hardware macro is initiated and stores the final values from the hardware macro in the instruction processing engine registers.

In one embodiment, the optimized representation is converted directly into a configuration bitstream with a customized synthesizer, place-and-route software, and bitstream generator. In another embodiment the optimized representation is converted to a form supported by software such as the JBits environment from Xilinx. The JBits software provides support for conversion to a bitstream and run-time reconfiguration. In yet another embodiment, assembly code is converted to C or Java code, which is then converted to HDL. After the conversion to HDL, standard tools are used to generate the configuration bitstream.

The present invention is believed to be applicable to a variety of applications, for example, mobile computing, desktop computing, and real-time control systems. Other aspects and embodiments of the present invention will be apparent to those skilled in the art from consideration of the specification and practice of the invention disclosed herein. It is intended that the specification and illustrated embodiments be considered as examples only, with a true scope and spirit of the invention being indicated by the following claims.

What is claimed is:

1. A method for executing instructions of a computer program in a computing arrangement that includes an instruction processing engine coupled to a programmable logic device (PLD), comprising the steps of:
    profiling the computer program during execution on the instruction processing engine, whereby profile data are generated for code segments in the computer program;
    selecting a code segment for transformation to a hardware implementation as a function of the profile data;
    transforming the code segment into a configuration bitstream that implements functionality performed by the code segment;
    configuring the PLD with the configuration bitstream; and
    activating the PLD to perform the function of the code segment in lieu of execution of the code segment during execution of the computer program.

2. The method of claim 1, wherein the profile data include execution frequencies of code segments and execution times of code segments.

3. The method of claim 1, further comprising evaluating code segments as a function of respective execution times of software implementations and execution times of hardware implementations.

4. The method of claim 1, further comprising:
    implementing functions of multiple selected code segments in the PLD;
    repeatedly evaluating code segments during execution of the application program as a function of the profile data;
    selecting a replacement code segment as a function of the profile data for a target code segment implemented in the PLD and transforming the replacement code segment into a configuration bitstream that implements the replacement code segment in place of the target code segment; and
    reconfiguring the PLD with the configuration bitstream.

5. The method of claim 4, further comprising caching configuration bitstreams associated with one or more target code segments.

6. The method of claim 4, wherein the profile data include execution frequencies of code segments and execution times of code segments.

7. The method of claim 4, further comprising evaluating code segments as a function of respective execution times of software implementations and execution times of hardware implementations.

8. The method of claim 4, further comprising:
    generating a driver code segment for interfacing with the PLD while the PLD is performing the functionality of the code segment; and
    executing the driver code segment on the instruction processing engine in lieu of the code segment.

9. The method of claim 1, further comprising:
    generating a driver code segment for interfacing with the PLD while the PLD is performing the functionality of the code segment; and
    executing the driver code segment on the instruction processing engine in lieu of the code segment.

10. The method of claim 9, further comprising replacing the first instruction of the code segment with a branch instruction that has a target address referencing the driver code segment.

11. The method of claim 1, further comprising:
    translating instructions of the computer program from a first instruction set to instructions of a second instruction set, wherein the first instruction set is associated with a processor architecture that is different from the instruction processing engine; and
    executing the instructions of the second instruction set by the instruction processing engine.

12. An apparatus for executing instructions of a computer program in a computing arrangement that includes an instruction processing engine coupled to a programmable logic device (PLD), comprising:
    means for profiling the computer program during execution on the instruction processing engine, whereby profile data are generated for code segments in the computer program;
    means for selecting a code segment for transformation to a hardware implementation as a function of the profile data;
    means for transforming the code segment into a configuration bitstream that implements functionality performed by the code segment;
    means for configuring the PLD with the configuration bitstream; and
    means for activating the PLD to perform the function of the code segment in lieu of execution of the code segment during execution of the computer program.

13. A computing arrangement, comprising:
    a bus;
    an instruction processing engine coupled to the bus, the instruction processing engine configured to execute instructions selected from a first set of instructions;
    a programmable logic device (PLD) coupled to the bus, the PLD having configuration ports coupled to the instruction processing engine and one or more data input/output ports; and
    a memory arrangement coupled to the bus, the memory arrangement configured with an application program and a transformation program that are both executable by the instruction processing engine, the transformation program including instructions that when executed cause the instruction processing engine to profile the application program during execution and generate profile data associated with segments of code in the application program, select a code segment for transformation to a hardware implementation as a function of the profile data, transforming the code segment into a configuration bitstream that implements functionality performed by the code segment, configure the PLD with the configuration bitstream, and activate PLD to perform the function of the code segment in lieu of execution of the code segment during execution of the application program.

* * * * *